United States Patent
Pearson

[15] 3,660,809
[45] May 2, 1972

[54] PRESSURE SENSITIVE HYDROPHONE
[72] Inventor: Raymond H. Pearson, Richardson, Tex.
[73] Assignee: Whitehall Electronics Corporation, Richardson, Tex.
[22] Filed: June 29, 1970
[21] Appl. No.: 50,707

[52] U.S. Cl. ..................340/8 S, 340/8 MM, 340/10, 340/14
[51] Int. Cl. ..................................G01v 1/38
[58] Field of Search ..................340/8 S, 8 MM, 10, 14

[56] References Cited

UNITED STATES PATENTS

| | | | |
|---|---|---|---|
| 2,607,858 | 8/1952 | Mason | 340/14 UX |
| 3,432,000 | 3/1969 | Ongrienhong et al. | 340/10 |
| 2,440,903 | 5/1948 | Massa | 340/10 |
| 3,320,581 | 5/1967 | Sims | 340/10 |
| 2,947,823 | 8/1960 | Harris | 340/8 MM |

Primary Examiner—Benjamin A. Borchelt
Assistant Examiner—N. Moskowitz
Attorney—Mason, Fenwick & Lawrence

[57] ABSTRACT

A marine hydrophone for producing electrical signals responsive to sound pressure waves in water, and especially adapted for use in towed seismic streamers. The hydrophone includes an annular piezoelectric ring with electroded inner and outer surfaces and a pair of thin circular diaphragms covering the opposite ends of the ring. The diaphragm portions within the inner surface of the ring are permanently formed inwardly toward each other. An assembly of a pair of such hydrophones supported by resilient rings on opposite ends of an axially elongated support cylinder mounted within an cylindrical enclosure having perforated end caps and mounted by a resilient tube between streamer spaces is also disclosed.

9 Claims, 13 Drawing Figures

PATENTED MAY 2 1972 3,660,809
SHEET 1 OF 2
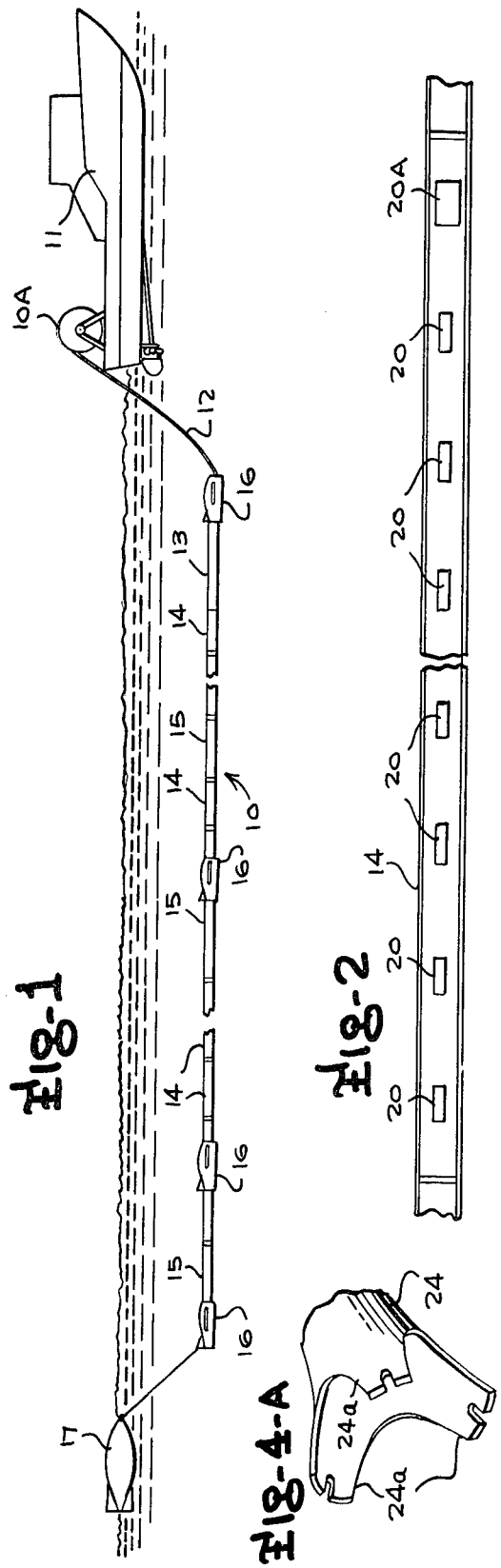
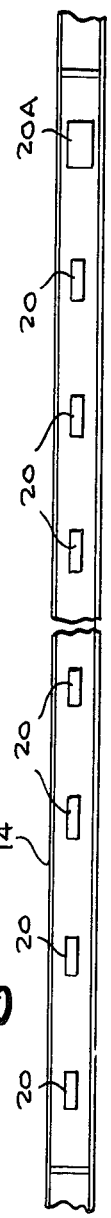
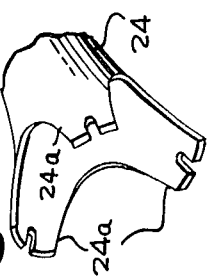
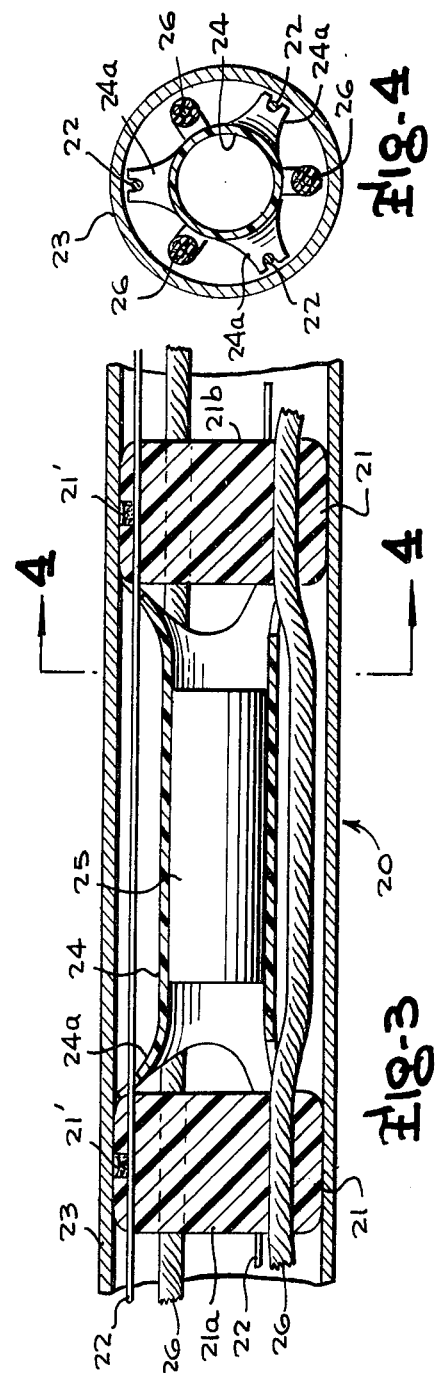
INVENTOR
RAYMOND H. PEARSON
BY
Mason, Fenwick & Lawrence
ATTORNEYS

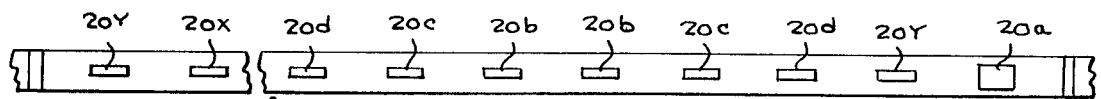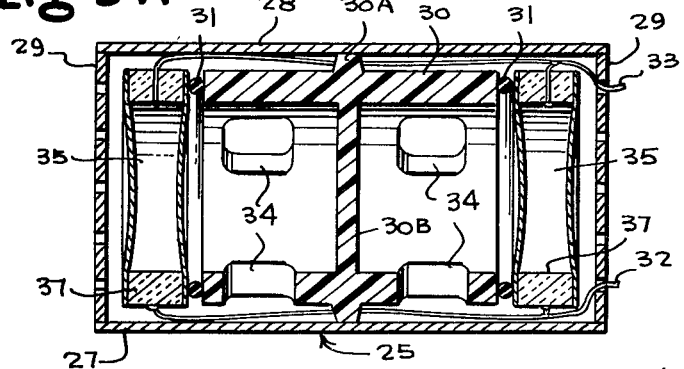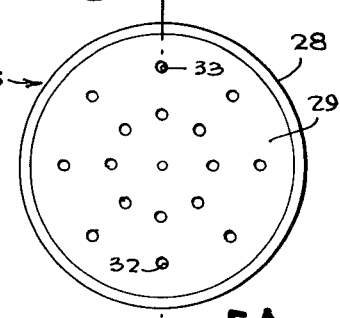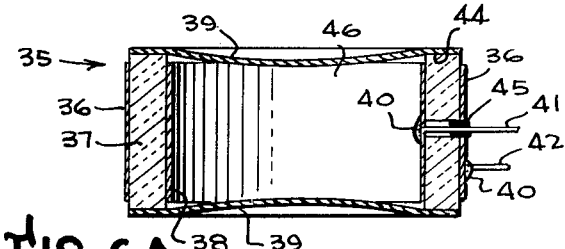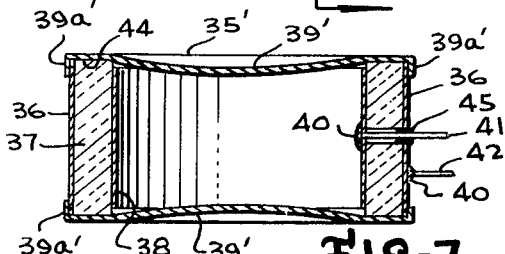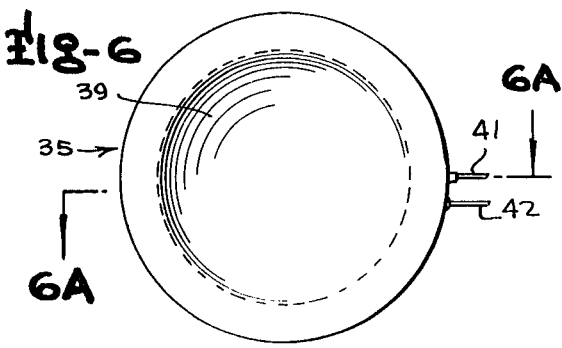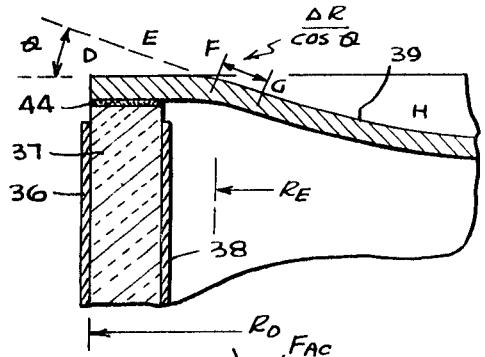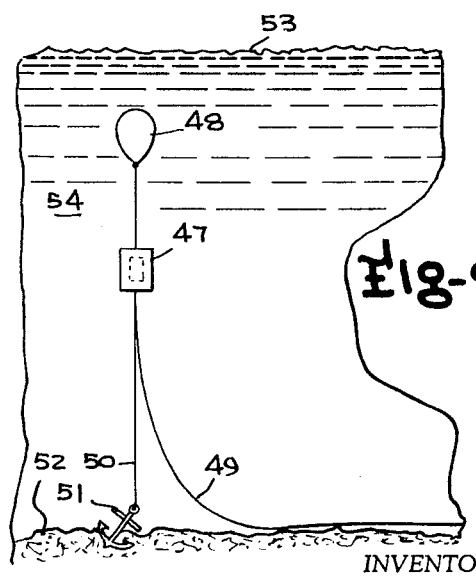

PRESSURE SENSITIVE HYDROPHONE

BACKGROUND AND OBJECTS OF THE INVENTION

The present invention relates in general to a pressure sensitive hydrophone useful as a high fidelity underwater sound detection device having a high sensitivity to sound pressure variations and a low sensitivity to accelerations imparted to the hydrophone. This hydrophone is particularly useful in sound detection systems utilizing stationary or towed hydrophones or arrays of hydrophones.

The electrical signal output of hydrophones due to sound radiation from distant or weak sources may be obscured or partially obscured by [1] noise in the amplification system, [2] thermal noise generated in the medium, [3] noise radiated from other sources, [4] noise output of the hydrophone due to erratic motion imparted to the hydrophone by turbulent flow of water relative to the hydrophone housing; and [5] vibration noise transmitted through the restraining, holding, and/or towing lines. The state of the art is such that in the case of towed hydrophones, the last two above-listed types of noise are serious limiting factors on the useful sound information picked up and on the speed of towing, and these two types of noise may also, and frequently do, limit the usefulness of sound information picked up by stationary hydrophones. Obviously the effect of these last two types of noise may be reduced by decreasing the physical size of the hydrophone. Reduction in size causes a reduction in sensitivity which will ultimately mean that the noise output due to the first two above listed types of noise equals or exceeds that due to the other causes. It is therefore important in order to obtain a real and substantial improvement over the state of the art, as this invention does, that a high sensitivity be provided.

The problem of noise of types [4] and [5] listed above has been recognized as a serious problem since seismic streamers were first used in surveying geological formations. Turbulent flow noise and noise transmitted through the towing lines are problems which were recognized in the Pasley U.S. Pat. No. 2,465,696. The speed with which a marine survey to a certain depth can be made with a streamer is limited by the signal-to-noise ratio. Improvement in the signal-to-noise ratio would, therefore, provide either improved signal output from the hydrophone in the seismic streamer sections towed as the same speeds as before, or would permit towing at higher speeds, thus at reduced cost, while still obtaining output signal quality as good as that provided by the seismic streamers previously available.

An object of the invention is the provision of a novel hydrophone which has a high sensitivity to sound pressure variations over a wide frequency range and a low sensitivity to accelerations produced by vibrations transmitted through the hydrophone mounting in stationary or towed systems.

A further object is to provide a novel hydrophone which translates the sound pressure variations of underwater sound waves through diaphragms to produce mechanical strains in a piezoelectric material and an electrical signal proportional to these strains.

Another object of this invention is to provide a novel mounting structure for hydrophones which minimizes the electrical output of the hydrophone due to acceleration of the hydrophone by forces transmitted through the mounting.

An additional object is to provide a means by which the sensitivity of the hydrophone may be altered in the seismic frequency range without altering the size or electrical impedance of the hydrophone.

Other objects, advantages and capabilities of the present invention will become apparent from the following detailed description, taken in conjunction with the accompanying drawings showing preferred embodiments of the invention.

BRIEF DESCRIPTION OF THE FIGURES

FIG. 1 is a diagrammatic view of a seismic streamer cable in a towed position of use;

FIG. 2 is a diagrammatic view showing the hydrophone locations within a single active streamer section;

FIG. 3 is a longitudinal section view of a portion of an active streamer section illustrating the manner in which the hydrophone assembly is mounted in the streamer section;

FIG. 4 is a transverse section view taken along the line 4—4 of FIG. 3;

FIG. 4A is a fragmentary perspective view showing the configuration of an end portion of the supporting tube for locating a hydrophone unit between a pair of cable spaces;

FIG. 5 is an end view of one of the hydrophone assemblies;

FIG. 5A is a longitudinal section view of the hydrophone assembly, taken along the lines 5A—5A of FIG. 5;

FIG. 6 is an end view of one of the two pressure sensitive elements in the hydrophone assembly;

FIG. 6A is a longitudinal section view taken along the line 6A—6A of FIG. 6;

FIG. 6B is a fragmentary section detail to enlarged scale illustrating adjoining portions of the ceramic ring and one of the diaphragms, and having a related force diagram thereon;

FIG. 7 is a section view illustrating a modified form of the pressure sensitive element;

FIG. 8 is a diagrammatic view showing hydrophone disposition in a single active tapered or non-linear array streamer section; and FIG. 9 is a diagrammatic illustration of a stationary listening device employing the hydrophone of the present invention.

DETAILED DESCRIPTION OF PREFERRED EMBODIMENTS

Referring to the drawings, wherein like reference characters designate corresponding parts, there is illustrated in FIG. 1 in diagrammatic form, a seismic streamer cable 10 secured to a drum 10A and towed through fresh or sea water by a boat or submarine 11 at various depths, generally up to 50 feet. The streamer cable 10 consists of the lead-in cable 12 which may have fairings and contain signal wires, strain cables, and other connection elements required for operation, followed by elastic sections 13, active sections 14, inactive sections 15, depth control units 16, and a conventional trailing element 17. The general method of operation of such streamer cables in conducting seismic exploration is described in the prior Pasley U.S. Pat. No. 2,465,696.

FIG. 2 illustrates diagrammatically a single active section 14, many of which are arranged in serial relation along the streamer cable, each of which has a plurality of hydrophone assemblies 20 disposed at equal or unequal distances between the hydrophones. The outputs of the hydrophone assemblies in a single section are usually connected in parallel and to an impedance matching transformer indicated at 20A. The active section 14 is formed of an outer tubular jacket or hose, formed for example of polyvinyl material, surrounding a plurality of spacers 21, which may be, for example, arranged with a pair of such spacers located about 6 inches apart and then the next pair of spacers located about 6 feet further along the cable from the first-mentioned pair. The spacers 21 are usually made of a rigid plastic material and have a plurality of holes through which are passed the plural signal conductors 26 and strain cables 22. The spacers also aid in maintaining the cylindrical shape of the thick walled flexible outer tube or jacket 23. The pair of spacers 21a and 21b as illustrated in FIG. 3 are maintained in selectively spaced relation, for example about 6 inches apart, by suitable means holding the spacers against movement relative to the strain cables 22, for example by having openings 21' extending from the outer periphery of the associated spacer to the holes through which the strain cables 22 pass, in which solder is inserted to bond to the strain cable and hold the spacer against axial movement.

Extending between the associated pair of spacers 21a and 21b is a flexible mounting tube 24, for example of soft flexible vinyl material, adapted to snugly fit about one of the cylindrical hydrophone assemblies 25 and having cut-outs at the ends thereof as illustrated in FIG. 4A providing three fingers 24a which are deformed outwardly against the adjacent confronting surfaces of the spacers and are suitably notched as illustrated in FIG. 4 to allow the fingers to be fitted on the strain cables 22 and thus flexibly hold the tube 24 in coaxial relation with the outer tube 23. The signal conductors 26 pass through the cut-out regions between the fingers 24 and through the holes provided therefore in the spacers 21. The void spaces in the streamer are filled with an appropriate liquid, for example deodorized kerosene, to provide nearly neutral buoyancy to the streamer section.

The construction of each hydrophone assembly 25 supported in each of the mounting tubes 24 is illustrated in FIGS. 5 and 5A. Each hydrophone assembly 25 comprises an outer cylindrical tube 28 of rigid material such as steel, and is equipped with perforated end caps 29 of like material which will allow the liquid in the streamer section to flow freely into the hydrophone assembly. A cylindrical spacer 30 is supported within the cylindrical tube 28 and is made of a rigid material in a generally cylindrical configuration having an outwardly projecting annular rib 30A extending circumferentially around the cylinder at its axial center thereof to engage the inner surface of the outer cylindrical tube 28. The cylinder spacer 30 has a hollow bore throughout the major portion of its length interrupted by a partition 30B at the axial center thereof to impart appropriate rigidity to the spacer cylinder, and has a plurality of openings 34 to permit the liquid in the streamer to pass freely into the bore portions of the spacer cylinder. A pair of hydrophone units 35 are supported adjacent the opposite axial ends of the spacer cylinder 30 by resilient circular rings 31, by bonding the hydrophone units by appropriate material such as epoxy adhesives or the like to the circular ring 31 at the adjacent end of the spacer 30 and similarly adhesively bonding the ring 31 to the spacer 30.

Each hydrophone unit 35 has an annular piezoelectric ring element 37, the spacer 30 having an inner diameter of approximately equal to the inner diameter of the piezoelectric ring 37 and an outer diameter, except for that portion forming the circumferential rib 30A, approximately equal to the outer diameter of the piezoelectric ring 37. The circumferential rib portion 30A of the spacer midway between the ends has an outer diameter very nearly equal to the inner diameter of the outer cylindrical tube 28 and is secured to the tube 28 by conventional means such as screws. The annular piezoelectric ring element 37, such as radially polarized lead zirconate titanate, has electroded surfaces 38 on the inner diameter and 36 on the outer diameter, formed for example by a silver coating baked onto the inner and outer surfaces of the ceramic material of the ring element. Suitable electrical conductors 41 and 42 are connected to the inner and outer electroded surfaces by means of solder or conductive cement 40, the conductor 41 passing through a radial hole in the ring element and being insulated from the electrode 36 by insulating sleeving 45. Two diaphragms 39 are secured, one to each end, to the annular piezoelectric ring element 37, by means of cement 44 or other suitable means. The diaphragms 39 are formed to provide a slightly concave shape as illustrated in FIGS. 6A and 6B, and are preferably made of metallic material, although materials such as plastics with or without reinforcing filaments are also suitable.

The forming of the diaphragm may be done prior to assembly to the annular piezoelectric ring element 37 or afterwards. The preferred method of forming the metal diaphragms is to secure the diaphragms in a flat state to the ends of the annular piezoelectric ring 37 and secure the leads 41 and 42 providing a leaked-tight volume 46 bounded by the diaphragms 39 and ring 37, and then apply hydrostatic pressure to the exterior of the hydrophone 35. Various amounts of deformation may be obtained using various hydrostatic forming pressures. I have used with success piezoelectric rings 1 inch in diameter and one-quarter inch long with metal diaphragms 0.001 inch to 0.010 inch thick and forming pressures up to 350 pounds per square inch.

The detailed configuration of the diaphragm and adjacent portion of the piezoelectric ring are more accurately depicted in FIG. 6B, which includes a forced diagram to be later used in explaining the theory of operation. The symbols DE, EF, FG, and GH represent various annular sections of the diaphragm 39. RE is the effective radius of the diaphragm from which the effective area may be calculated, and $R_o$ is the outer radius of the piezoelectric ring 37.

When the hydrophone unit described above and depicted in FIG. 6A is immersed in a sound field having a pressure "$p$," strains will be produced in the piezoelectric ring by [a] the pressure "$p$" applied radially to the outer surface of the ring 37, [b] the pressure "$p$" axially to the diaphragm areas and transmitted to the ends of the ring 37, and [c] a radial force on the ring generated by axial movement of the diaphragms due to the pressure "p." The effects of the strains produced by [a] and [b] above are well documented in the literature [R. A. Lengevin, J. Acoust. Soc. Amer., 26, 1954, 421]. The effects of the strains produced by [c] above are referred to by W. P. Mason, U.S. Pat. No. 2,607,858, and by G. C. Tibbetts, U.S. Pat. No. 2,403,692. The effect of [c] above is diagrammatically depicted in the Force Diagram of FIG. 6B where $F_{CB}$ is the force acting axially on the diaphragm, $\theta$ is the angle between the annular flat section of the diaphragm DE and the annular conical section FG in which the strain force $F_{AB}$ is parallel to FG, and $F_{AC}$ is the resultant radial force. The section of the diaphragm GH acts in a rigid manner. The annular section EF bends in the manner of a flat plate; however, the effect of bending can be neglected where the center of the diaphragm is formed inward a distance greater than two times the thickness of the diaphragm [see S. Timoshenko, Vibration Problems in Engineering, D. van Nostrand, p. 453]. The effective pressure PE acting on the two diaphragms is given by $$PE = P [R_E^2 / RL \tan \theta]$$

where L is the axial length of the ring. I have obtained electrical outputs over a wide frequency range from hydrophones made as described which result in effective sound pressures of up to 20 times the actual pressure. Since the degree of diaphragm forming controls the angle $\theta$, it is a simple matter to produce hydrophone units having sensitivities from equal to, to many times that of, the conventional hydrophone having rigid flat end caps or no end caps. The sensitivity is also controllable by varying the material and/or thickness of the diaphragm.

As shown in FIG. 5A, the hydrophone assembly has two hydrophone units 35 electrically connected in parallel to leads 32 and 33. The sensitivity of the hydrophone assembly to axial, transverse and rotational vibration is extremely low. Axial vibration will be transmitted through the cylindrical housing 28, through the central ridge 30A on the outer diameter of the spacer 30, through the spacer 30 with equal amplitudes through the resilient rings 31 [provided not necessarily for the purpose of absorbing shock, but to distribute forces around the cylinder] to the piezoelectric rings 37 producing electrical outputs of equal and opposite polarity resulting in negligible output. Transverse and rotational vibrations are similarly transmitted through the outer cylinder 28 to the piezoelectric rings 37 and produce strains of equal magnitude and opposite direction in adjacent equal volumes of the piezoelectric material resulting in negligible output.

FIG. 7 illustrates an alternative construction of the hydrophone unit which is generally similar to the construction illustrated in FIG. 6A. The FIG. 7 form includes the same annular piezoelectric ring element 37, such as radially polarized lead zirconate titanate, which is silver coated on the inner and outer surfaces of the ceramic material to electrode these surfaces, providing electrode surfaces 36 and 38 on the outer and inner surfaces respectively. The electrical conductors 41 and 42 are connected to the inner and outer electroded surfaces in the same manner as in the previous embodiment, by means of solder or conductive cement 40, and the conductor 41 passes through a radial hole in the ring element and is insulated from the electrode 36 by an insulating sleeve 45. The two diaphragms 39', one on each end, are secured to the annular piezoelectric ring element 37 by means of cement 44, and have their outer lips turned over approximately 90° as indicated at 39a', providing annular lips to lap inwardly over a shallow zone of the outer surface of the ring 37 adjacent each end of the ring. This facilitates locating the diaphragms 39' on the ends of the piezoelectric ring 37 during assembly.

By mounting the hydrophone units 35 or 35' on the opposite ends of the supporting cylinder 30 by the intervening resilient rings 31 and supporting this assembly in the cylinder 28 and in turn between the spacers 21 in the manner described, sensitivity of the hydrophone assembly to axial vibrations, transverse vibrations, and rotational vibrations are minimized. Axial vibrations transmitted to the microphones or hydrophones 35 through the rigid cylinder 30 and resilient rings 31 will cause strains in the two piezoelectric rings 37 which produce electrical outputs of equal and opposite polarity resulting in negligible output. Transverse and rotational vibrations transmitted through the rigid cylinder 30 and the rings 31 will produce strains in opposite directions in adjacent equal volumes. Since the resilient rings 31 are mounted on the mean diameter of the piezoelectric rings, the resultant electrical output will be negligible. Pressure on the diaphragms of the hydrophone due to axial or rotational motion of the hydrophones relative to the surrounding fluid medium will produce equal and opposite strains on the piezoelectric rings, also resulting in negligible output.

Instead of using the active streamer section 14 as illustrated diagrammatically in FIG. 2, the active streamer section can be provided with hydrophones in the manner indicated diagrammatically in FIG. 8, wherein the reference character 20A is an impedance matching transformer, and the hydrophone assemblies 20b, 20c, 20d, . . . , 20y are of different sensitivities and are located along the axial length of the active streamer section 14A in a manner to produce a tapered or non-uniform array. This is sometimes required where a particular directional characteristic is desired for the streamer section. The usefulness of such arrays is discussed in the literature [see C. H. Savit, et al, The Moveout Filter, Geophysics, Vol. 23, No. 1, 1958]. The required different sensitivities can be obtained by altering the angle $\theta$ defined in FIG. 6B and/or diaphragm thickness or material.

The hydrophone assembly herein described is also useful as a stationary sound wave receiver in a body of water, as diagrammatically depicted in FIG. 9. The hydrophone assembly, which may be a single hydrophone unit 35, or may be an assembly 25 as previously described having a pair of hydrophone units 35 mounted on opposite ends of the rigid cylinder 30 and resilient rings 31, is housed in a suitable container 47 and held up by a buoy or float 48 at appropriate location between the bottom 52 and surface 53 in the body of water 54. The assembly is anchored by anchor 51 and cable 50 to maintain its proper location. The cable 49 containing electrical conductors is connected to the hydrophone assembly in the container 47 and leads to an appropriate amplifier or a transmitter for transmitting output to a remote location.

From the foregoing, it will be apparent that the hydrophone assembly and method of mounting described herein is particularly useful as a stationary or towed sound sensor in an aqueous medium in view of its high sensitivity to sound radiation and its low sensitivity to vibrations which cause acceleration of the hydrophone housing or mounting. In regard to towed hydrophone units, particularly as used in seismic streamers, the streamer system is always in motion and changes that cannot be avoided produce acceleration forces that give rise to unwanted signals, and workers in the art are always striving to get higher response to acoustical pressure and minimum response to acceleration. The hydrophone assembly and mounting structure herein above described provides significant improvement in the signal-to-noise ratio attainable in such seismic streamers. The ease with which hydrophone units having controllable, difference sensitivities can be produced also renders the hydrophone units of the present invention particularly useful in active or non-uniform array seismic streamers.

What is claimed is:

1. A marine hydrophone for responding to sound pressure waves in water, including a radially polarized annular piezoelectric ring having inner and outer cylindrical surfaces concentric with the axis of the ring, means forming first and second electrodes on said inner and outer surfaces respectively extending over most of the area of the surfaces and electrical conductors connected to the respective electrodes for conducting away from the hydrophone electrical signals representative of strains produced in the piezoelectric ring by such pressure waves, said ring having annular end surfaces at the two opposite ends thereof, and a pair of thin circular diaphragms respectively covering the opposite ends of said ring having peripheral portions of the diaphragms secured to said annular end surfaces, said diaphragms being each permanently formed inwardly toward the axial center of the ring defining inwardly dished zones over the diaphragm portions located radially inwardly of said inner cylindrical surface.

2. A marine hydrophone as defined in claim 1, wherein each of said diaphragms includes an outer edge preformed into a short cylindrical flange having an inner diameter slightly larger than the outer diameter of said ring and located in overlapping relation to a portion of said outer cylindrical surface of the ring.

3. A marine hydrophone assembly for an elongated seismic streamer designed to be towed under water, comprising a hydrophone unit including a radially polarized annular piezoelectric ring having inner and outer cylindrical electroded surfaces concentric with the axis of the ring, electrical conductors respectively connected to the inner and outer electroded surfaces for conducting away from the hydrophone electrical signals representative of strains produced in the piezoelectric ring by sound pressure waves in the water, said ring having annular end surfaces at the two opposite ends thereof, and a pair of thin circular diaphragms respectively covering the opposite ends of the ring having circumferential portions adjacent the periphery of each diaphragm secured to said annular end surfaces, said diaphragms being each permanently formed inwardly toward the axial center of the ring defining inwardly dished zones substantially throughout the diaphragm portion lying radially inwardly of said inner cylindrical surface.

4. A marine hydrophone assembly as defined in claim 3, wherein said assembly includes diaphragm support means, said diaphragm support means including a circular resilient ring of substantially circular cross-section and having a diameter corresponding substantially to the mean diameter of the piezoelectric ring, means securing said resilient ring to said hydrophone unit against the surface portion of one of said diaphragms lying between the said inner and outer cylindrical surfaces, and means supporting said resilient ring within said seismic streamer in coaxial relation to the streamer axis.

5. A marine hydrophone assembly as defined in claim 3, including diaphragm supporting means and a second hydrophone unit like said first-mentioned hydrophone unit, said diaphragm supporting means having opposite annular end walls substantially coextensive with the annular end surfaces of said ring, and means for supporting said first-mentioned hydrophone unit and said second hydrophone unit respectively on said end walls with said hydrophone units supported in coaxial relation to a longitudinal axis of the streamer and spaced longitudinally along said axis.

6. A marine hydrophone assembly as defined in claim 5, wherein said diaphragm supporting means is an axially elongated substantially hollow supporting cylinder having perforations in the cylindrical wall thereof for communication of fluid pressure waves into the hollow portion of said cylinder and against the diaphragms of the two hydrophone units facing in confronting relation to each other and to said cylinder, and said means for supporting said hydrophone units on the annular end walls of said supporting cylinder comprising a circular ring of substantially circular cross-section and having a diameter corresponding substantially to the mean diameter of the piezoelectric ring secured to each respective annular end walls and to the adjacent confronting portion of the confronting diaphragms of the respective hydrophone units.

7. A marine hydrophone assembly as defined in claim 6, wherein the assembled supporting cylinder and pair of hydrophone units are supported within a cylindrical enclosure, the supporting cylinder having an outwardly projecting circumferential rib at the axial midregion thereof bearing outwardly against and secured to an enveloping cylindrical wall of the cylindrical enclosure, said cylindrical enclosure having perforated end caps for admitting fluid into the cylindrical enclosure and through said openings in said supporting cylinder, the seismic streamer having an outer jacket of circular cross-section and a pair of cylindrical plastic spacers supported therein in coaxial relation to the axis of the streamer spaced a selected distance along the axis thereof, and means extending between said spacers supporting said cylindrical enclosure therebetween in coaxial relation with the streamer.

8. A hydrophone assembly as defined in claim 7, wherein said means for supporting said cylindrical enclosure comprises an elongated hollow resilient tube having an inner diameter corresponding substantially to the outer diameter of said cylindrical enclosure for gripping and supporting the same substantially in the longitudinal midregion of the tube, said tube having a plurality of radially outwardly flaring finger formations at the opposite ends thereof pressed radially outwardly from the center axis of the tube along the surface of the adjacent spacer, and means restraining said tube against rotation relative to said spacers 9. A marine hydrophone assembly as defined in claim 8, wherein said last mentioned means comprises notches in the free edge portions of said finger formations, said seismic streamer having strain cables extending therealong through said spacers, and said notches being interfitted about said strain cables to prevent relative rotary movement of the tube with respect to the spacers.

* * * * *